(12) United States Patent
Cubranich

(10) Patent No.: US 6,683,240 B1
(45) Date of Patent: Jan. 27, 2004

(54) DRUMMERS FOOT EXERCISER AND BASS DRUM PRACTICE PEDAL

(76) Inventor: Mark Cubranich, 273 Middle Park Dr., Souderton, PA (US) 18964

( * ) Notice: Subject to any disclaimer, the term of this patent is extended or adjusted under 35 U.S.C. 154(b) by 0 days.

(21) Appl. No.: 10/238,473

(22) Filed: Sep. 10, 2002

(51) Int. Cl.[7] .............................................. G09B 15/06
(52) U.S. Cl. ...................................... 84/465; 84/422.1
(58) Field of Search ........................ 84/465, 467, 468, 84/422.1

(56) References Cited

U.S. PATENT DOCUMENTS

| | | | | |
|---|---|---|---|---|
| 4,406,208 A | * | 9/1983 | Nazer | 84/453 |
| 4,501,421 A | * | 2/1985 | Kane et al. | 482/80 |
| 4,862,875 A | * | 9/1989 | Heaton | 601/26 |
| 5,803,907 A | * | 9/1998 | Patchett et al. | 600/301 |

* cited by examiner

Primary Examiner—Shih-Yung Hsieh
(74) Attorney, Agent, or Firm—Donald W. Meeker

(57) ABSTRACT

An adjustable spring-loaded hinge connects a pedal with a base normally biased at an acute angle. The spring which is adjustable in tension resists downward movement of the pedal to provide exercise and practice for a drummer. A height adjustable stop limits the movement of the pedal. A pickup or transducer may be used in the stop. An extension arm removably attachable to the pedal allows playing a percussion instrument.

8 Claims, 3 Drawing Sheets

US 6,683,240 B1

DRUMMERS FOOT EXERCISER AND BASS DRUM PRACTICE PEDAL

BACKGROUND OF THE INVENTION

1. Field of the Invention

The invention relates generally to foot activated musical drum impacting devices, and more particularly to a practice device for exercising the foot on a simulated drum pedal not attached to a drum, which can be used with a transducer or other pickup to produced synthesized sound, and which may be used with an adaptive arm as an active drum pedal for striking a drum, block, cymbal, tambourine, or other percussion instrument, and used with a piezo transducer or other pickup can be used for playing electronic sound generators.

2. Description of the Prior Art

There are many devices such as practice drum pads for drummers that allow, with the use of sticks, for practicing rudiments and simulate playing a drum. Drummers also have their legs and feet they use with other drum instruments, such as bass drum pedals; high hat pedals; and auxiliary pedals.

The prior art primarily concerns actual drum pedals used for striking drums with various configurations and modifications.

U.S. Pat. No. 6,392,130, issued May 21, 2002 to Karl R. Carlson, provides an improved drum pedal having movable head pivots, a clutch on a beater connect, a compression spring with a bearing mount, a circular ramp (Memory Lock release) for cam adjustment of the drum rim clamp, and a cog belt/cog wheel linkage combination.

U.S. Pat. No. 4,691,613, issued Sep. 8, 1987 to Luke Jacobson, shows a bass drum pedal includes a base frame with a pivotal footplate assembly for driving a rotatable shaft supported on the frame. A hammer is connected to the drive shaft, and is moved to impact on a drum head. A cable connects the footplate to a generally spiral shaped torque arm mounted to the drive shaft. The torque arm is adjustable to vary the amount of footplate movement per unit of hammer sweep. A spring and chain are connected between the frame and drive shaft to return the hammer to a resting position after being operated to impact on the drum. A pair of sprockets are eccentrically mounted with the chain wrapped around them such that the amount of footplate movement per unit of total spring tension can be increased or decreased throughout the hammer stroke. The footplate assembly includes a heel plate, arch plate and toe plate each adjustably attached to a pair of rails pivotally connected to the base frame at the heel end. The heel, arch and toe plates are specially contoured to support the foot and prevent "cupping" and rolling of the foot during high speed playing. An acoustic drum simulator assembly adjustably secured to the drive shaft is connected to one end of a coil spring wrapped around the drive shaft. The other end of the coil spring is attached to a collar which holds the hammer. The spring allows a limited amount of additional rotation of the drive shaft past the point at which the hammer contacts the drum head, to thereby simulate the feel of an acoustic drum when utilizing the pedal on an electronic drum.

U.S. Pat. No. 4,346,638, issued Aug. 31, 1982 to Masao Hoshino, indicates a foot-operated drum pedal is composed of a rocker constituted in a sprocket, and a chain connecting between the sprocket and the toe end of a pedal element. In the foot-operated pedal, a block and an inverse U-shaped bracket are attached respectively to both ends of the chain using pins, the block is screwed to the toe end of the pedal element and the bracket is screwed to and grips the sprocket, and a machine screw which is inserted between rollers of the chain disposed along the block is screwed to the block.

U.S. Pat. No. 4,235,146, issued Nov. 25, 1980 to James R. Purdy, puts forth a base drum pedal assembly is disclosed and includes a foot pedal for operating a beater head, the foot pedal including a foot plate which is slidably mounted on a support coupled to the beater head and which is biased towards a rest position. In use, the player depresses the foot pedal and can, at the same time, slide the foot plate forward against its biasing. At the end of a stroke, the pedal returns upwardly and the foot plate is returned to its rest position by said biasing means.

U.S. Pat. No. 5,591,929, issued Jan. 7, 1997 to Ronald J. Wellman, concerns a device for beating drums selectively by either foot. A first foot mechanism controls the movement of a first mallet. A second foot mechanism controls the movement of a second mallet remotely. A third foot mechanism controls the movement of a third mallet. A fourth foot mechanism controls the movement of a fourth mallet remotely. A first support mechanism, adjacent the first and fourth foot mechanisms, elevates a heel portion of a foot. A second support mechanism, adjacent the second the third foot mechanisms, elevates a heel portion of a foot.

U.S. Pat. No. 5,509,342, issued Apr. 23, 1996 to Brad Augsburger, illustrates a foot pedal assembly which has the same general operating components as a conventional foot pedal assembly, but with a comparatively exaggerated length of the foot pedal part. The longer foot pedal can be played with the same feel as a conventional foot pedal, and allows the staging of bass drums further away from the percussion artist than had conventionally been possible.

U.S. Pat. No. 2,800,828, issued Jul. 30, 1957 to Sanford A. Moeller, discloses a bass drum pedal designed so that the heel assumes a natural position.

U.S. Pat. No. 1,369,233, issued Feb. 22, 1921 to G. M. Fitzgerald and H. C. Lockley, claims a double drum pedal to allow the drum to be struck with or without the cymbal using a single foot.

U.S. Pat. No. 922,706, issued May 25, 1909 to William F. Ludwig, describes a drum and cymbal playing pedal which is adjustable and detachable.

U.S. Pat. No. 4,976,181, issued Dec. 11, 1990 to Wu H. Hsieh, is for a means for maintaining cymbal pedal tightness includes a fixed fitting to which both a cymbal pedal is attached and to either end of which a spring fitting is attached. The other end of each spring fitting is attached to an adjusting fitting. The adjusting fitting is fixably disposed directly above the pedal. A depression of the cymbal pedal pulls downwardly on the fixed fitting causing the springs in the spring fitting to extend. A subsequent release of the pedal releases the tension on the springs allowing the pedal to return to its original position. The tension in the springs is adjustable by means of gears disposed within the adjusting fitting.

There is a need for a simulated drum pedal to be used for exercising the foot of the drummer without the noise of striking a drum.

SUMMARY OF THE INVENTION

An object of the present invention is to provide a height adjustable pedal having a tension adjustable spring-loaded hinge that allows practicing pedal movement and exercising for a drummer's foot and leg without the normal noise associated with drumming.

Another object of the present invention is to provide an attachable extension arm to permit playing percussion instruments.

One more object of the present invention is to provide a velocity sensor or piezo transducer pickup for generating sound on electronic devices.

In brief, the pedal of the present invention provides a simulated drum pedal for exercising the foot and leg without having an actual bass drum or high hat stand and cymbals, which take up a lot of space and are not for quiet playing. This is a portable and quiet device a drummer can use in a hotel room, class room, and other locations where it is desired to minimize the noise level and minimize transportation and setting up of a bass drum or practice drum set, so that a drummer can practice pedal technique or warm up before a performance and improve control, speed and endurance without the high volume associated with playing a drum set.

An attachable extension arm attached to the end of the pedal allows for striking other sounding devices. Drummers and percussionists can use this to strike other sounding devices such as: tambourine, cowbell, wood block, etc. A shaker can be attached and the back and forth movement as if playing with the hands can be achieved.

A velocity sensor can be used for sending velocity information to an electronic receiving device. With a velocity sensor the pedal can trigger electronic sounding devices. The sound-to-electrical transducer is connected to an audio jack assembly which in turn allows the drum to be connected to conventional downstream electronics. With a piezo transducer attached to the stopper portion of the pedal it can send info to an electronic sound source, making it an electronic pedal.

The pedal has a variable spring tension adjustment as well as pedal stopper height adjustment. This allows user to adjust pedal for comfortable playability. The height is adjustable through the stopper height. The underside of the stopper has a protruding screw that is received by a female threaded opening located on the base plate of the pedal. Counterclockwise rotation raises the stopper reducing the amount of distance between the stopper and top pedal plate allowing less movement by the user. Clockwise rotation does the opposite.

The top plate resting position (or starting position) is adjustable as well. On the center of the hinge are 3 (approx.) threaded holes where a stopping screw can be positioned. These stop the top plate to the desired resting position. One position setting allowing the plate to start closer to (and needing less movement to) the stopper.

One end of the coil spring is attached to bottom plate hinge at a permanent position. The other end is attached to a movable part that when pushed in and rotated adjusts the amount of spring tension. When released it locks into the top plate hinge.

An advantage of the present invention is that it allows drumming practice and exercise with no noise.

Another advantage of the present invention is that it can be modified to play percussion instruments.

An additional advantage of the present invention is that it can be modified to play electronic sound generating devices.

BRIEF DESCRIPTION OF THE DRAWINGS

These and other details of my invention will be described in connection with the accompanying drawings, which are furnished only by way of illustration and not in limitation of the invention, and in which drawings.

BEST MODE FOR CARRYING OUT THE INVENTION

Figure 1:
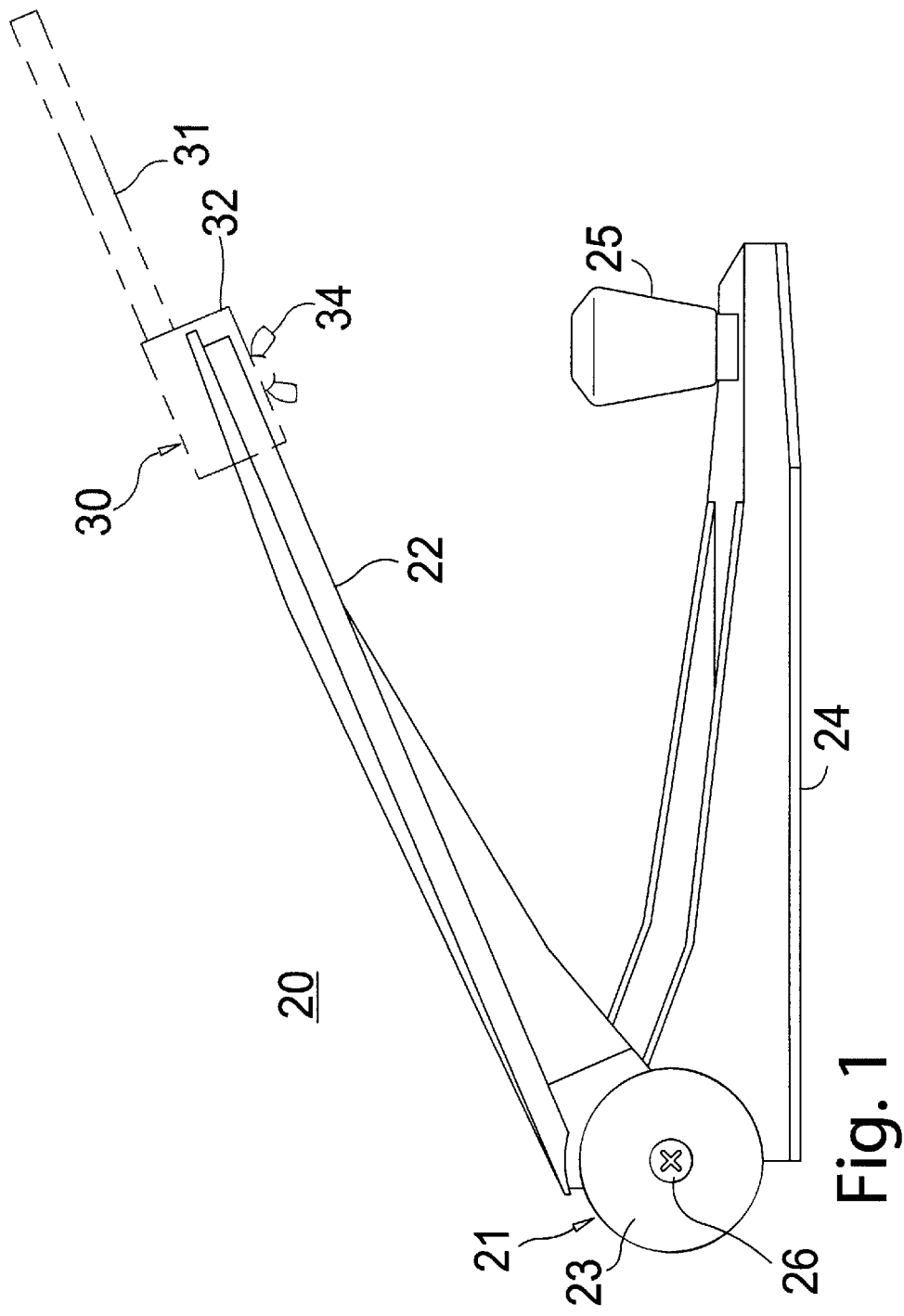
FIG. 1 is a side elevational view of the drum exercise pedal of the present invention showing a removable extension arm which can be added for playing a percussion instrument.
Figure 2:
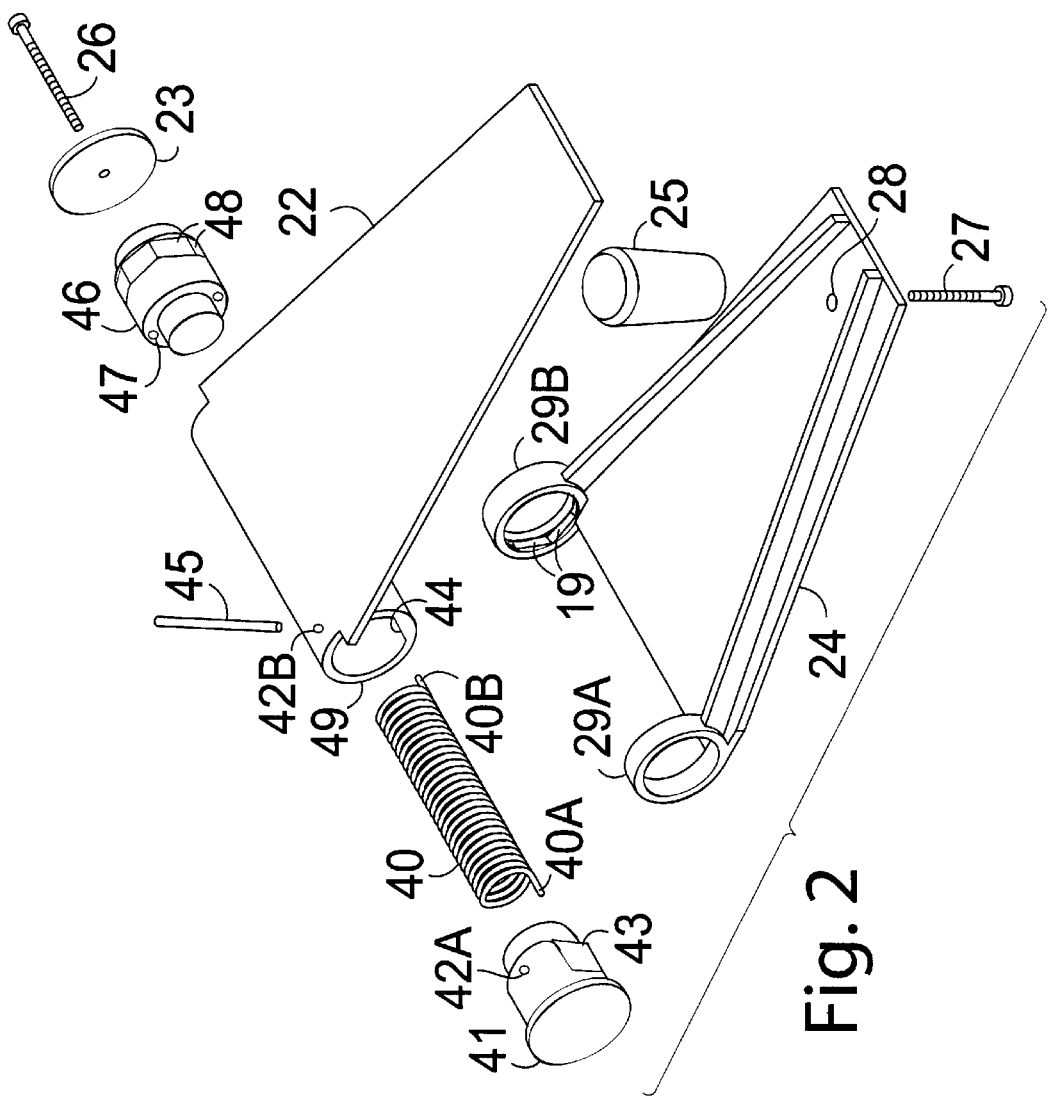
FIG. 2 is a perspective view of the parts of the drum exercise pedal aligned for assembly.
Figure 3:
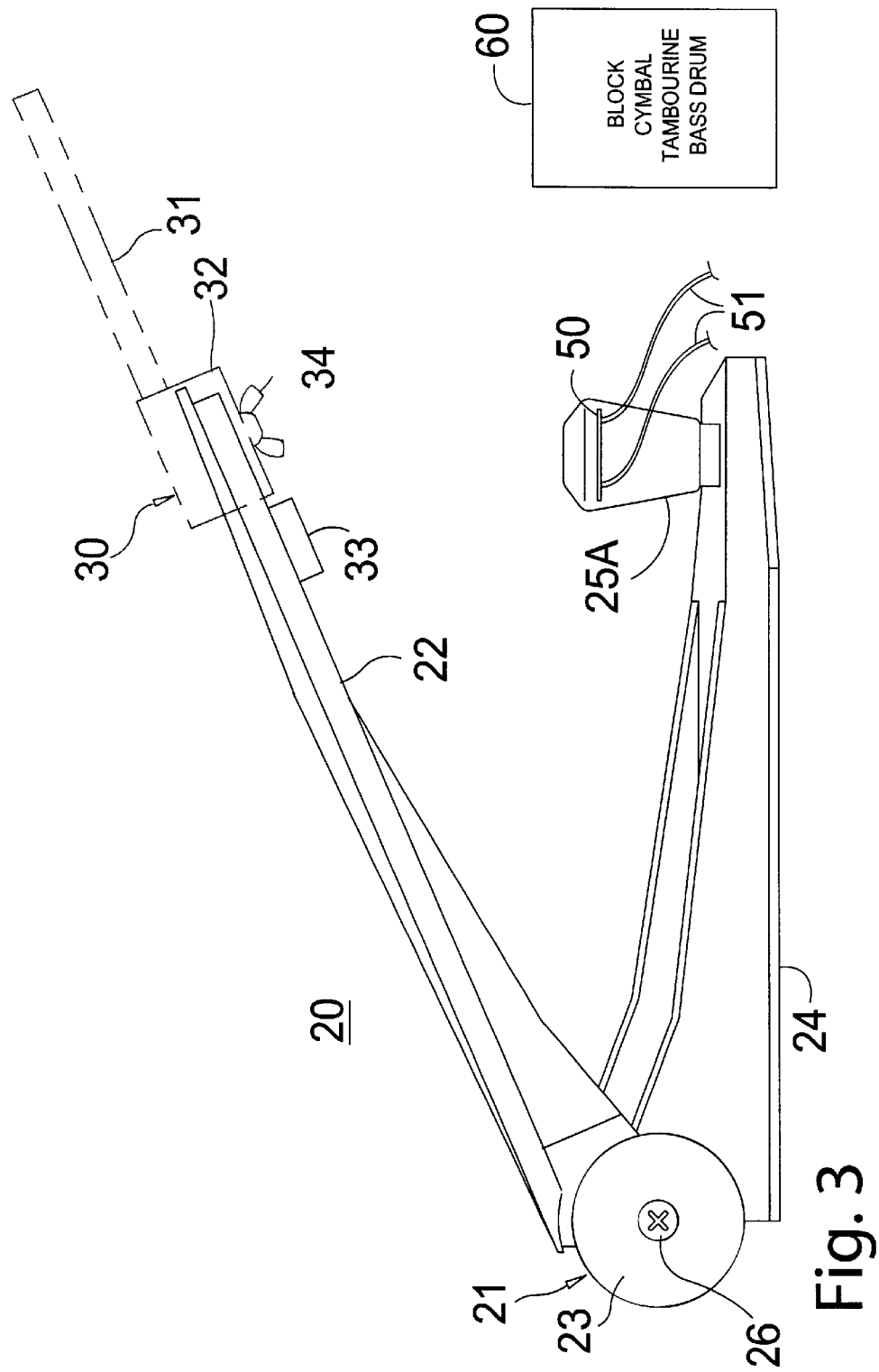
FIG. 3 is a side elevational view of the drum exercise pedal having a sound deadening means and a pickup on the stop for sending electrical impulses to an electrical sound producing means.

In FIGS. 1–3, a drum pedal exercise device 20 for practicing a drum pedal motion and exercising a foot and leg of a drummer comprises a top pedal portion 22 capable of receiving a foot of a user thereon, a bottom base portion 24 capable of resting flat on a horizontal surface, a spring loaded hinge 21 connecting the top pedal portion 22 and base portion 24 at a proximal end for normally biasing the two portions apart and maintaining the top peal portion 22 at an acute angle upwardly angled away from the base portion 24; the spring loaded hinge 21 capable of causing a resistance to a foot of a drummer attempting to press the pedal portion 22 down toward the base portion 24, and a stop 25 attached to one of the portions, preferably the base portion 24, adjacent to a distal end and protruding therefrom for engaging the other of the portions upon depression of the pedal portion.

The length of the protruding stop 25 is adjustable by screwing to an adjustable desired height on a screw 27 through a base hole 28, as seen in FIG. 2, to control the degree of closure between the top pedal portion 22 and the bottom base portion 24.

The tension of the spring loaded hinge 21 is adjustable for causing varying amounts of resistance to the depression of the top pedal portion 22. In FIG. 2 the spring loaded hinge comprises a coil spring 40 having a first end 40A attached to one of a series of holes around a first end piece 41, which is attachable to one of the portions, preferably the top pedal portion 22, and the spring having a second end 40B attached to at least one hole 47 in a second end piece 46 which is attachable to the other of the portions, preferably the bottom base portion 24, so that changing the position of the first end 40A of the spring in the series of holes in the first end piece 41 adjusts the tension of the spring loaded hinge. The first end piece 41 has a series of holes similar to the holes 47 shown in the second end piece 46.

As seen in FIG. 2, the first end piece 41 is attachable to the top pedal portion 22 by having a rigid element, such as a screw or pin 45 inserted through a hole 42B in the top pedal portion 22 and through a mating hole 42A in the first end piece 41. The first end piece further comprises an end piece flat 43 which mates with a pedal flat 44 on an end of a cylinder 49 across the distal end of the pedal portion 22. The angle of the top pedal portion 22 relative to the base portion 24 may be adjusted by placing the pin through other holes in the top pedal portion similar to the hole 42B in a first end portion without a flat.

The second end piece 46 is attachable to the bottom base portion 24 by having a series of flats 48 formed around an outer end of the second end piece 46 which engage mating flats 19 on an inner edge of a circular ring 29B on the side of a distal end of the base portion 24, as a rotatably adjustable attaching means, and the tension in the spring is adjustable by rotating the second end piece 46 relative to the bottom base portion 24.

In FIG. 3, a sound absorbing means 33, such as a patch of foam, is attached to the top pedal portion 22 at a position opposite the stop 25A attached to the base portion 24 to deaden the sound of the contact with the stop 25A. A means for generating an electrical impulse 50, such as a pickup or piezo transducer or velocity sensor, may be positioned in the stop 25A so that upon contact of the top pedal portion 22 with the stop 25A, a wiring means 51 can transmit an electrical signal from the means for generating an electrical impulse 50 to an electronic sound producing means (not shown).

In FIGS. 1 and 3, an extension arm 30 may be removably attachable to a distal end of the top pedal portion 22 to enable a drumstick like portion 31 of the extension arm to strike a percussion instrument 60, such as a block, cymbal, tambourine, bass drum or other percussion instrument. A clamp 32 with a wing nut 34 may be used to attach the extension arm 30 to the top pedal portion 22.

It is understood that the proceeding description is given merely by way of illustration and not in limitation of the invention and that various modifications may be made thereto without departing from the spirit of the invention as claimed.

What is claimed is:

1. A drum pedal exercise device for practicing a drum pedal motion and exercising a foot and leg of a drummer, the device comprising:

a top pedal portion capable of receiving a foot of a user thereon;

a bottom base portion capable of resting flat on a horizontal surface;

a spring loaded hinge connecting the top pedal portion and base portion at a proximal end for normally biasing the two portions apart and maintaining the top peal portion at an acute angle upwardly angled away from the base portion; the spring loaded hinge capable of causing a resistance to a foot of a drummer attempting to press the pedal portion down toward the base portion;

a stop attached to one of the portions adjacent to a distal end and protruding therefrom for engaging the other of the portions upon depression of the pedal portion.

2. The device of claim 1 wherein the length of the protruding stop is adjustable to control the degree of closure between the top pedal portion and the bottom base portion.

3. The device of claim 1 wherein the tension of the spring load ed hinge is adjustable for causing varying amounts of resistance to the depression of the top pedal portion.

4. The device of claim 3 wherein the spring loaded hinge comprises a coil spring having a first end attached to one of a series of holes around a first end piece, which is attachable to one of the portions, and the spring having a second end attached to at least one hole in a second end piece which is attachable by a rotatable adjusting means to the other of the portions, so that rotating the second end piece adjusts the tension of the spring loaded hinge.

5. The device of claim 4 wherein the first end piece is attachable to one of the portions by having a rigid element inserted through one of a series of holes in the one of the portions and through a mating hole in the first end piece and the angle between the top pedal portion and the base portion is adjustable by placing the rigid element in a different one of the holes.

6. The device of claim 1 further comprising a sound absorbing means attached to one of the portions at a position opposite the stop attached to the other of the portions to deaden the sound of the contact with the stop.

7. The device of claim 1 wherein the stop further comprises a means for generating an electrical impulse upon contact with the stop and a wiring means for connecting the means for generating an electrical impulse with an electronic sound producing means.

8. The device of claim 1 further comprising an extension arm removably attachable to a distal end of the top pedal portion to enable the top pedal portion to strike a percussion instrument.

* * * * *